United States Patent

[11] 3,573,477

[72] Inventor Michael C. Klapes
Lynnfield, Mass.
[21] Appl. No. 760,340
[22] Filed Sept. 17, 1968
[45] Patented Apr. 6, 1971
[73] Assignee Delta Engineering Corporation
Winchester, Mass.

[54] RADIATION SENSITIVE APPARATUS FOR DETECTING CONVEYED ARTICLES
7 Claims, 6 Drawing Figs.

[52] U.S. Cl..................................................... 250/223,
235/92, 250/222
[51] Int. Cl...................................................... G06m 7/00
[50] Field of Search.......................................... 251/218,
222, 223, 239, 219; 235/92—301 (PC); 356/102

[56] References Cited
UNITED STATES PATENTS

| | | | |
|---|---|---|---|
| 3,032,691 | 5/1962 | Cubellis......................... | 250/219X |
| 3,197,646 | 7/1965 | Anders et al................... | 250/239X |
| 3,207,909 | 9/1965 | Lakso et al. ................... | 250/223 |
| 3,225,963 | 12/1965 | Arpajian........................ | 250/223X |
| 3,388,258 | 6/1968 | Grant............................. | 250/218 |

Primary Examiner—Walter Stolwein
Attorney—Nicholas A. Pandiscio

ABSTRACT: An improved article-detecting apparatus for use with a counting machine of the type having a conveyor for carrying articles to be counted from a supply hopper to a batching station, the detecting apparatus is adapted to sense each article on said conveyor and to provide a signal output for a counter in response to each article that is sensed, the detecting apparatus comprises a light source for directing a substantially horizontal beam of light laterally across the conveyor to a photocell, and means for vertically adjusting the light beam and photocell relative to the conveyor.

Patented April 6, 1971

INVENTOR
MICHAEL C. KLAPES
BY
*Nicholas A. Pandiscio*
ATTORNEY

INVENTOR
MICHAEL C. KLAPES
BY
*Nicholas A. Pandiscio*
ATTORNEY

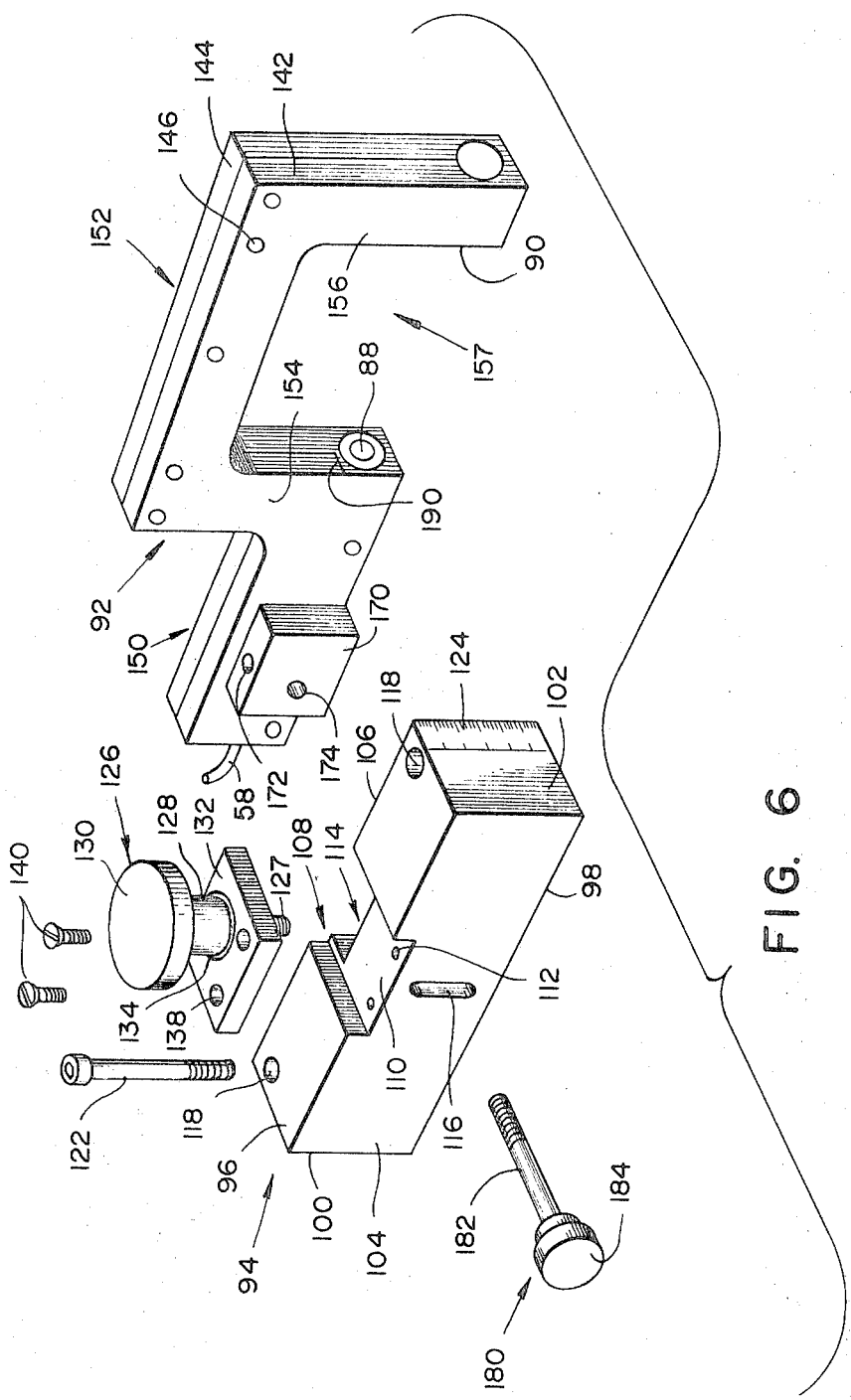

RADIATION SENSITIVE APPARATUS FOR DETECTING CONVEYED ARTICLES

This invention relates to machines for counting and batching articles at high speeds and more particularly to an improved article counting system.

Counting machines of the type to which this invention relates are well known in the art, e.g., U.S. Pat. No. Re. 25,013, issued Jul. 25, 1961, to E.G. Cleveland et al. for "Apparatus For Counting And Packaging Articles," and my prior U.S. Pat. No. 3,001,636, issued Sept. 26, 1961, for "Apparatus For Channeling Articles." These machines have wide utility and are used, for example, in the drug and hardware industries to facilitate filling of individual packets, boxes, and other containers with a predetermined number of articles. Essentially, such machines comprise a supply hopper adapted to receive a loose supply of articles to be counted, a feeder unit for discharging the articles from the hopper, means for advancing the articles one by one to a batching station, a detecting unit for sensing each article as it advances to the batching station, and means responsive to the detecting unit for counting each article that is sensed. Typically, the means for advancing the articles to the batching station includes a continuously-moving endless conveyor belt and a guide assembly comprising a pair of guide members that define a channel parallel to the belt, sufficient in width to accommodate the articles in single file. So as to enable one counting machine to accommodate articles of different shapes and sizes, e.g., screws, capsules, washers, etc., the guide assembly should be adjustable with respect to the width of the channel.

In the typical counting system of the type described above, the detecting unit comprises a light source for producing a beam of light which is disposed so as to be intercepted by the articles carried on the conveyor belt, and a photocell disposed to receive the light beam when it is not intercepted by an article. The counting means typically is an electronic or electric counter which counts the number of times the photocell is deprived of the light beam.

In the machines described in said U.S. Pat. Nos. Re. 25,013 and 3,001,636, the detector unit is located downstream of the discharge end of the conveyor and upstream of the batching station, in position to detect articles in their free fall path to the batching station. Experience has demonstrated that such prior counting machines exhibit accuracy of a high order when counting solid symmetrically-shaped articles such as tablets, pills, etc. However, it is difficult to achieve the same high degree of accuracy in detecting and counting thin, elongated articles such as nails. In such case the light beam must be accurately centered with respect to the channel-defining guide members so that it will be intercepted by each and every article passing from conveyor to the batching station. In this connection it should be appreciated that the trajectory of the articles depends on their weight and the speed of the conveyor. Hence the position of the light beam must be established in accordance with such trajectory. The smaller the cross section of the articles to be counted, the more critical becomes the need for properly positioning the light beam with respect to the centerline of the article channel and the article trajectory. While the degree of criticality is materially reduced by using two beams displaced 90° from one another, it has been found that miscounts can still occur in the case of objects such as nails which are so small in cross section that they can actually miss both beams. It also has been attempted to solve this miscount problem by using a wider beam. However this also has not been successful since not enough light is blocked to produce an easily detectable and reliable signal input to the counter.

Accordingly, the principal object of the present invention is to provide an article-detecting system that overcomes the above limitations.

More specifically the object of this invention is to provide an article-counting machine which is consistent in accuracy, regardless of the size and shape of the articles being counted, and which has an article-detecting assembly that is easily adjustable so as to insure accurate detection of the articles being handled.

These and other objects are achieved by providing a photoelectric article-detecting unit which is positioned adjacent the upper flight of the conveyor belt at the discharge end thereof and which is vertically adjustable, with respect to the upper flight of the conveyor belt. This article-detecting unit is embodied in a machine which additionally comprises a feeder unit, a moving conveyor belt positioned to receive articles from the feeder unit, a guide assembly that can be adjusted to define a channel along which the articles are advanced in single file by the moving belt, a counter responsive to the detecting unit for counting the articles, and a batching station responsive to the counting means for batching the articles in a predetermined number.

Other objects, features and many of the attendant advantages of the invention are explicitly described or are rendered obvious by the following detailed description which is to be considered together with the accompanying drawings, wherein:

FIG. 6 is an exploded view of the article-detecting unit.

Figure 1:
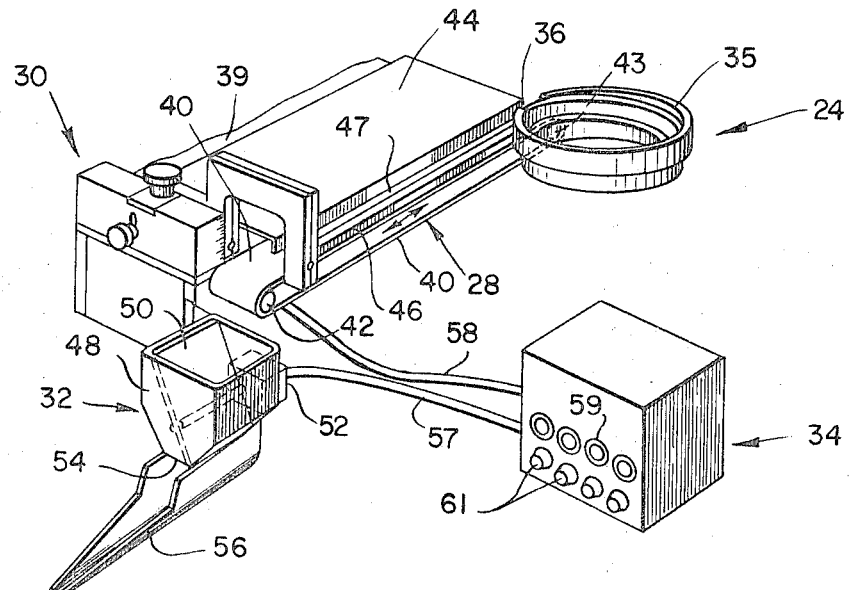
FIG. 1 is a perspective schematic view of a particular section of the apparatus of FIG. 2.
Figure 2:
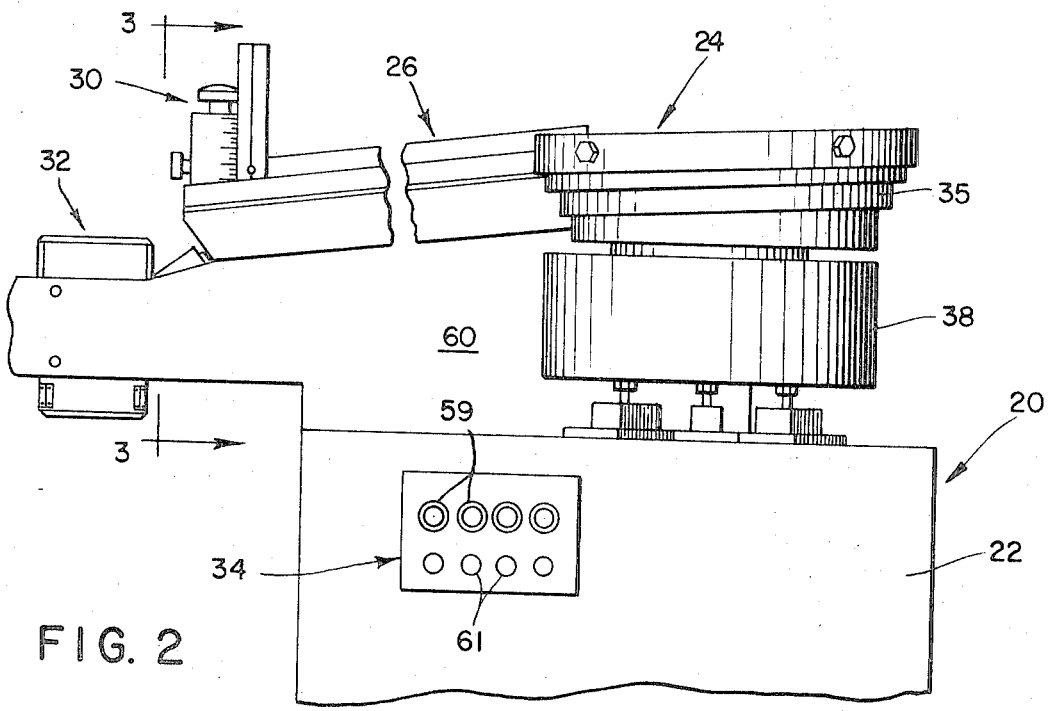
FIG. 2 is an elevation side view of a preferred form of article counting apparatus embodying the present invention.
Figure 5:
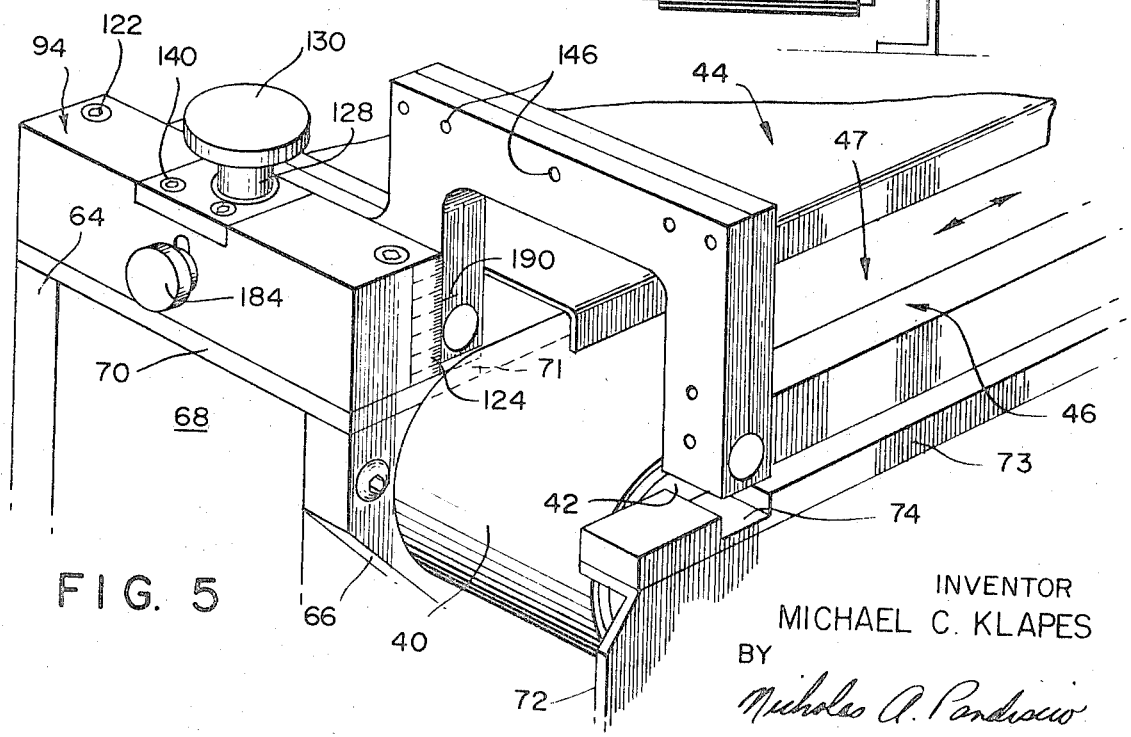
FIG. 5 is an enlarged, detailed perspective view showing the article-detecting unit attached to the article-counting apparatus of FIG. 2.

Referring now to FIGS. 1, 2, and 5, there is shown an article-counting machine which includes a base 20 in the form of a cabinet 22 that supports article-handling apparatus comprising a feeder unit 24, a guide assembly 26, a conveying system 28, a detecting unit 30, and a batching station 32. The detecting unit and batching station are electrically coupled to an electric counter 34 which is adapted to count electrical pulses generated in response to articles sensed by the detecting unit 30 and to initiate operation of the batching station 32 each time a predetermined count is reached.

A loose supply of articles are discharged into the feeder unit 24, typically by hand or by a bucket elevator or the like (not shown). The feeder unit comprises a conventional bowl 35 with a helical ramp extending along the interior surface of its sidewall and adapted to advance articles in single file to a discharge opening 36 in response to the influence of a vibrator 38. It is to be understood that the vibrator is adapted to be connected to a suitable power source and that its control circuit embodies a suitable controller (not shown) for varying its operation so as to modify the rate at which articles are caused to be discharged from the bowl feeder. Such feeder units are well known in the art and offer a number of desirable features including reliability, adjustability of feeding rate, and little or no article damage. The discharge opening 36 of bowl 35 is located so as to deliver articles onto the conveying system 28 which generally comprises a frame 39, a pair of pulleys 42,43, rotatably supported by the frame 39, and a conveyor belt 40 that is mounted for movement on pulleys 42,43. Although not shown, it is to be understood that the frame 39 also supports a motor and speed reducer and means for transmitting power from the motor via the speed reducer to the shafts supporting pulleys 42,43, so that the belt is driven in the direction by the arrows in FIGS. 1 and 5, pulley 42 is at the discharge end of the conveyor belt.

Associated with the upper run of the belt is the guide assembly 26 which comprises two parallel guide members 44,46 (FIG. 3) which cooperate to form a guide channel 47 that serves to align the articles on the belt so that they will pass in single file to the batching station. One of the guide members, preferably member 44, is movable with respect to the other so as to vary the width of the channel.

The batching station 32 comprises a hopper 48 provided with a butterfly valve 50 which is operated by suitable means, such as a rotary solenoid system 52. The preferred construction of the hopper is such that when valve 50 is one position, e.g., the inclined position of FIG. 1, articles are collected and prevented from passing through the open bottom end 54. Upon actuation of the solenoid system, the butterfly valve rotates to a second position so as to permit gravity discharge of articles onto a delivery chute 56, which may direct the articles to various types of apparatus, such as a packaging machine (not shown). Alternatively, the design of valve 50 and hopper 48 may be such that the valve acts to divert the articles so that they are discharged from one side or the other of the hopper, with the articles falling through the hopper rather than accumulating therein until a predetermined count is reached. In such an alternate arrangement two chutes 56 would be used, each positioned to receive articles depending upon the position of valve 50.

The electric eye system and the rotary solenoid system are connected by suitable cables 57,58 (FIG. 1) to counter 34 which may be positioned remote from the article counting apparatus (FIG. 1) or mounted within cabinet 22 (FIG. 2). Each time the light beam is intercepted or broken by an article, a count is registered by the counter. It is to be understood that the counter includes a plurality of decade counting circuits as well as a power supply for such circuits and also for detecting unit 30 and solenoid system 52. For operator convenience, the counter may include a plurality of numeric display units 59 one for each decade of count. The counter is adapted to count electrical pulses generated in response to articles sensed by the detecting unit 30 and preferably also includes appropriate control dials 61 which can be preset to emit an output pulse and initiate operation of solenoid system 52 when a predetermined number of counts have been registered. The pulse transmitted is of sufficient amplitude and duration to cause the butterfly valve to reverse its position. The valve then returns to its original position when another output pulse is received by solenoid system 52 from the counter.

Figure 3:
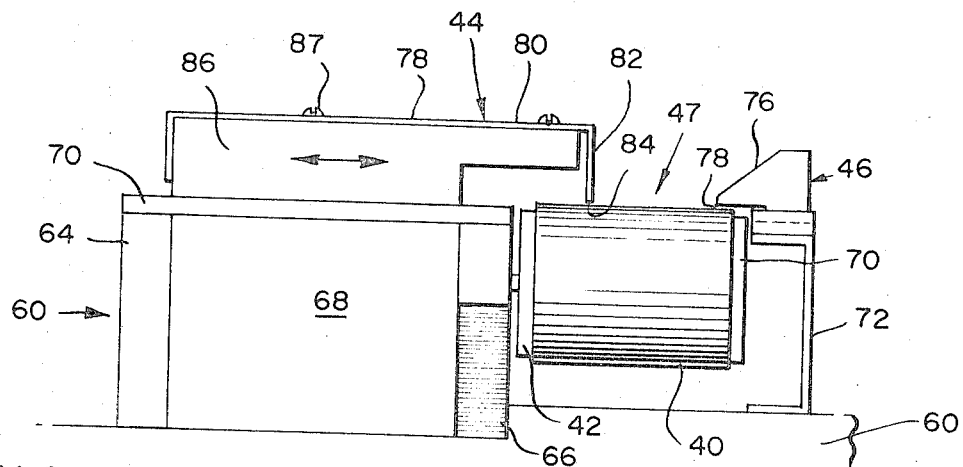
FIG. 3 is a view taken substantially along line 3—3 of FIG. 2, with the article-detecting unit removed.

As shown in FIGS. 2 and 3, the conveying system 28, detecting unit 30, and batching station 32 are mounted onto a vertical extension 60 of cabinet 22. This extension includes as an integral part thereof two parallel side panels 64,66, as well as an end-cover panel 68 (FIG. 3). Overlying the top edge of the side panels and secured thereto is a flat top plate 70 having a laterally extending notch 71 (FIG. 5) located so as to intersect a vertical plane passing through the center axis of pulley 42. Also mounted on the extension 60 is a third side panel 72. Panel 72 cooperates with panel 66 to enclose the conveyor belt and the pulleys 42,43. Affixed to and extending along the top flange of side panel 72 is a flat bar 73 (FIG. 5) having a notch 74 coextensive with notch 71 and also located so as to intersect a vertical plane passing through the center axis of pulley 42. Mounted on bar 73 is guide member 46 which is of triangular or preferably trapezoidal cross section and is characterized in having an inclined surface 76 and a shallow guiding edge 78. One end of guide member 46 terminates just short of notch 74. The other end of guide member 46 is located so that it can guide but not interfere with articles as they leave feeder bowl 35.

The adjustable guide member 44 is made of sheet metal or the like and is formed with a flat, continuous upper surface 80 and a depending side flange 82 which extends parallel to guide member 46 and is disposed substantially perpendicular to belt 40. The lower edge 84 of flange 82 terminates close to but short of the conveyor belt. Guide member 44 is fixably secured to a support block 86 by suitable means such as screws 87. Block 86 is substantially coextensive in length with top plate 70 and is laterally slidable thereon so that guide member 44 can be moved toward or away from the stationary guide member 46. Since guide member 46 is fixed with respect to the discharge opening 36, the only adjustment required to be made to achieve proper transfer from the bowl to the conveyor belt in single file is changing the width of the channel by laterally moving support block 86, i.e., moving side flange 82 relative to guide member 46. The means for supporting block 86 and sliding it laterally relative to top plate 70 are described in my application, Ser. No. 618,497. This same application also describes means for maintaining proper alignment of guide channel 47 with respect to the batching station 32.

Referring now to FIGS. 5 and 6, it is shown that the article-detecting unit comprises a light source 88 and a photocell or photodiode 90 mounted within yoke assembly 92 which is adjustably coupled to a base member 94, so as to be vertically adjustable therewith; the base member being fixably secured to the top plate 70.

Base member 94 is of a regular shape such as a cube or rectanguloid and is characterized by top and bottom surfaces 96,98, ends 100,102, and sides 104,106. Substantially bisecting top surface 96 and extending horizontally from side 104 to 106 is a rectangular notch 108 having a horizontal surface 110. A pair of tapped vertical holes 112 are formed in surface 110. A second rectangular notch 114 bisects the rear side 106 and extends vertically from top surface 96 to bottom surface 98. As shown in FIG. 5, notch 114 is somewhat less in width than notch 108. A vertically elongated through slot 116 extends from substantially the center of side 104 to notch 114.

Figure 4:
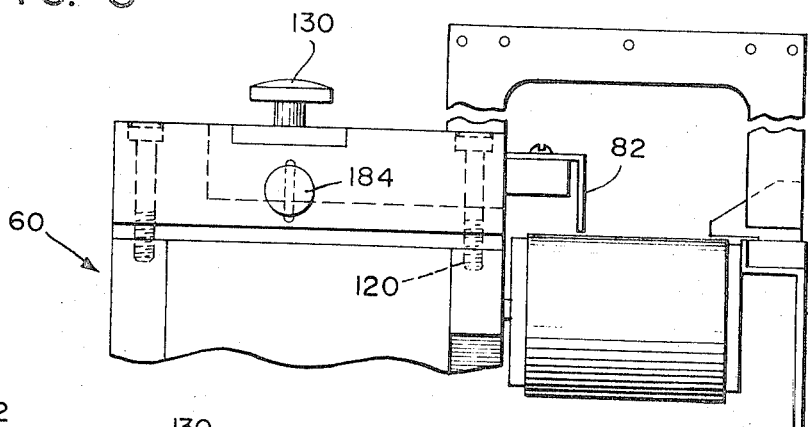
FIG. 4 is a view similar to FIG. 3 but with the article-detecting unit attached.

Top surface 96 of the base member is also characterized by a pair of spaced countersunk holes 118 which extend substantially vertically through the base member. These holes are aligned with a corresponding pair of threaded holes 120 formed in top plate 70 and side panels 64 and 66 (FIG. 4). As shown in FIGS. 5 and 6, a pair of screws 122 are inserted into holes 118 and are sized so as to be threadingly engageable with holes 120, and thus secure base member 94 to top plate 70.

It is also to be noted that a series of graduations are provided along end surface 102, such as by a rule 124 secured to the base member by an epoxy cement or like means. These graduations may be according to any convenient subdivision, e.g., millimeters or sixteenths of an inch, and are arranged so as to indicate the height above the uppermost surface of belt 40.

The yoke assembly 92 comprises a pair of matched half-sections 142,144 laterally secured to each other by suitable means such as screws 146. As shown in FIG. 6, the thickness of yoke 92 is such that it is slidable within notches 71 and 74. The yoke is formed so that a portion thereof forms a support arm 150 integrally connected to a second portion 152 shaped to define a generally rectangular arch having a pair of opposing legs 154,156 the distance between which defines an opening 157 which is larger than the width of conveyor belt 40. The bottom surface of support arm 150 is flat and coplanar with the bottom surface of legs 154,156.

Although not shown, it is to be noted that the mating sides of the two half-sections 142,144 are recessed so as to define any interior passageway for one end of cable 58. Sandwiched between the two half-sections adjacent the base of leg 156 and disposed toward the opposite leg is photocell or photodiode 90 disposed to receive a beam of light from light source 88 which is mounted in a correspondingly manner in the leg 154 adjacent the base thereof. One end of cable 58 is attached to the counter. The other end is coupled to the light source and photodiode inside of the yoke assembly 92.

A cubic or rectanguloid block 170 is affixed to the arm position 150 of half-section 142, as by screws (not shown). The size of the block is such that it makes a closing sliding fit in vertical notch 114. Block 170 is characterized in having a vertical tapped through hole 172 and a horizontal threaded hole 174 which extends into the block and is substantially perpendicular to yoke 92. Hole 174 is laterally displaced from hole 172, as shown in FIG. 6.

The yoke and base member are slidably connected together by a thumb screw assembly 126 which also permits vertical adjustment of the yoke. Thumbscrew assembly 126 comprises a thumbscrew 130 whose shank includes a large unthreaded section 128 terminating in a threaded section 127 that is sized so as to be engageable with hole 172. Screw 130 is rotatably mounted in a rectangular bracket 132 having a hole fitted with a bushing 134. The large unthreaded section 128 of thumbscrew 130 is captivated in bushing 134 so that the screw can rotate but cannot move axially relative to bracket 132. The latter is sized to fit within notch 108 and has a pair of spaced through holes 138 which, when the bracket is positioned within the notch, are aligned with tapped holes 112. The bracket is locked to base member 94 by a pair of screws 140 which pass through holes 138 and mate with tapped holes 112. When the yoke and base member are connected in the foregoing manner, rotation of thumbscrew 130 will cause vertical movement of the yoke relative to base member 94.

Means also are provided for locking the yoke against movement relative to the base member. Such means comprises a locking screw 180 with a threaded shank sized so as to be engageable with hole 174. Screw 180 has a large head or knob 184 and is inserted through vertically elongated slot 116 into hole 174. Because slot 116 is vertically elongated, screw 180 can move with yoke 92 while the latter is being adjusted vertically. While the yoke is adjusted, screw 180 is backed off so that its knob 184 does not engage base member 94. After the yoke has been satisfactorily raised or lowered, screw 180 is turned until knob 184 is tight against surface 104 and the block 170 is drawn up tight against the adjacent notch 114 of base member 94, whereupon the yoke and base member are effectively locked together so as to prevent further vertical movement of the yoke.

Referring to FIG. 5, it is to be understood that when base member 94 is fastened to top plate 70 by screws 122, the yoke assembly 92 is aligned directly above notches 71 and 74. The latter are wide enough to receive the support arm and legs 154 and 156 of the yoke and hence permits the yoke to be lowered sufficiently for the light beam to be even with the upper surface of the upper run of the conveyor belt. The actual height of the beam with respect to the conveyor belt is determined by a line 190 which is provided on the leg 154 and functions as a moveable pointer with respect to scale 124.

Operation of the machine described above is believed to be obvious to persons skilled in the art and is briefly described as follows. Assume a supply of articles of predetermined size are to be counted and batched. The operator first loosens locking screw 180 just enough to unlock the yoke. Then thumbscrew 130 is turned until the light beam from light source 88 is at the desired level above conveyor belt 40. Initially the desired level is determined by trail and error. Once a satisfactory setting for the yoke has been achieved the height is noted from scale 124 and recorded. Hence when at some subsequent time another supply of the same product is to be counted, the yoke height is set using scale 124 as a guide. Assuming that the yoke has been set at the desired level and the machine is operating, articles will be delivered from bowl 35 onto the conveyor belt and, because of the channeling function of the guide members 44 and 46, will be transported in single file toward the detector unit. As each article passes and intercepts the light beam, a pulse is generated and transmitted to the counter. Succeeding pulses generated by other articles are similarly received by the counter which maintains a total count. After passing the light beam, the articles shoot off of the conveyor and fall into the batching unit 32 where they are collected. When a predetermined count has been reached, the counter automatically produces an output signal that is used to energize solenoid system 52 and thereby cause the butterfly valve to change positions discharging the articles to chute 56. Articles continuing to fall into the batcher hopper will be collected until the same predetermined count is again reached, whereupon the butterfly valve will again reverse its position and the collected articles will be discharged. This counting and batching operation continues until the supply of articles is exhausted or until the vibrator is stopped.

The adjustability of the height of the light beam is advantageous not only with respect to accommodating different size articles to be counted but also with respect to conveyor belt thickness. In certain cases where relatively heavy or abrasive articles are to be handled, it may be necessary to substitute a heavier, i.e., thicker conveyor belt, in which case the yoke must be raised if it is desired to maintain a predetermined distance between the light beam and the upper surface of the belt's upper run. The provision of notches 71 and 74 offer the advantage that the beam can be lowered so that the bottom portion thereof is just even or slightly below the upper surface of the belt. Having the beam partly obstructed by the belt can be tolerated if the amount obstructed is insufficient to generate a count signal and is advantageous where relatively thin flat articles are being counted. An additional advantage of the invention is that it is not necessary to use two intersecting beams to detect the articles being processed. With a single beam located at the end of the conveyor belt just downstream of the two guide members, as herein described, an accurate count of articles is easily achieved. Of course, the invention also contemplates that the light source and photocell arrangement may be duplicated on the same yoke so that one or more parallel vertically spaced light beams cross the normal path of the articles.

Since certain changes may be made in the above apparatus without departing from the scope of the invention herein involved, it is intended that all matter contained in the above description or shown in the accompanying drawing shall be interpreted in an illustrative and not a limiting sense.

I claim:

1. In combination with an article-counting machine having a conveying system comprising a conveyor belt having an elongated run for carrying said articles along a predetermined path to a point at which said articles are discharged to a batching station, a feeding unit for delivering said articles to said conveyor belt, a guide assembly for aligning said articles in single file on said conveyor, said guide assembly terminating short of said point of discharge, and a counter responsive to a detecting unit arranged to detect said articles on said conveyor belt, an improved detecting unit connected to said counter comprising:

a light source located to one side of said conveyor belt run between said guide assembly and said point of discharge and oriented so as to direct a beam of light substantially laterally and substantially horizontally over and across said conveyor belt run;

a photocell located at the opposite side of said conveyor belt run between said guide assembly and said point of discharge and oriented to receive said light beam so long as said light beam is uninterrupted by articles on said conveyor;

support means supporting said light source and said photocell;

means for vertically adjusting said support means so as to adjust the height of said substantially horizontal beam relative to said conveyor belt run; and means for indicating the vertical adjustment of said support means relative to said conveyor belt.

2. In combination with an article-counting machine having a conveying system comprising a conveyor belt having an elongated run for carrying said articles along a predetermined path to a point at which said articles leave said conveyor and are discharged to a batching station; a feeding unit for delivering said articles to said conveyor belt, and a counter responsive to a detecting unit arranged to detect said articles on said conveyor belt; an improved detecting unit connected to said counter comprising:

light source located to one side of said run upstream of said point of discharge and oriented s as to direct a beam of light substantially laterally over and across and substantially parallel to said run;

a photocell located at the opposite side of said run upstream of said point of discharge and oriented to receive said light beam so long as said light beam is uninterrupted by articles on said conveyor;

support means supporting said light source and said photocell;

means for vertically adjusting said support means so as to adjust the height of said beam and said photocell relative to said run, whereby the accuracy of said detecting unit is independent of the trajectory followed by said articles when discharged into said batching station; and means for indicating the vertical adjustment of said support means relative to said conveyor belt.

3. In combination with an article-counting machine having a conveying system comprising a conveyor belt having an elongated run for carrying said articles along a predetermined path to a batching station, a feeding unit for delivering said articles to said conveyor belt, a guide assembly for aligning said articles in single file on said conveyor and a counter responsive to a detecting unit arranged to detect said articles on said conveyor belt, an improved detecting unit connected to said counter comprising:

a light source located to one side of said conveyor belt run and oriented so as to direct a beam of light substantially laterally and substantially horizontally across said conveyor belt run;

a photocell located along said elongated run at the opposite side of said conveyor belt run and oriented to receive said light beam so long as said light beam is uninterrupted by articles on said conveyor;

vertically adjustable support means supporting said light source and said photocell whereby to permit adjustment of the height of said detecting unit relative to said conveyor belt run, said support means comprising a yoke having a pair of exposed legs and a portion which connects said legs and straddles said conveyor belt run, said light source supported by one of said legs and said photocell supported by the other of said legs;

a block fixably secured to said yoke and having a vertical, threaded hole;

a base member fixably secured to said article-counting machine;

a bracket secured to said base member; and a screw carried by said bracket so that it can rotate but cannot move axially relative to said bracket, said screw being engaged with said vertical, threaded hole so the rotation thereof in one direction will cause said yoke to move vertically upward relative to said base member and rotation thereof in the opposite direction will cause said yoke to move vertically downward relative to said base member.

4. The apparatus of claim 11 further including a vertical notch in said base member, said notch sized to slidably accommodate said block.

5. The apparatus of claim 11 wherein said block is further characterized by a horizontal threaded hole and wherein said base member is further characterized by a vertical slot; and further including a threaded locking screw sized to pass through said vertical slot and be engageable with said horizontal threaded hole, said locking screw having a knob larger than the width of said slot so that when said screw is disposed through said slot into said vertical hole, said screw can be turned until said knob is tight against said slot and said block is drawn up against the vertical slot of said support member, whereupon the yoke and base member are locked together so as to prevent further movement of the yoke.

6. The apparatus of claim 3 further including vernier means for measuring the vertical movement of said yoke, said means comprising a scale secured on said base member and a horizontal line on the yoke which functions as a movable pointer with respect to said scale.

7. In combination with an article-counting machine having a conveying system comprising a conveyor belt having an elongated run for carrying said articles along a predetermined path to a batching station, a feeding unit for delivering said articles to said conveyor belt, a guide assembly for aligning said articles in single file on said conveyor, and a counter responsive to a detecting unit arranged to detect said articles on said conveyor belt, an improved detecting unit connected to said counter comprising:

a light source located to one side of said conveyor belt run;

a photocell located at the opposite side of said conveyor belt run;

a support member which laterally straddles said conveyor belt run, said light source and photocell mounted to said support member so that said light source produces a substantially horizontal beam of light which passes laterally over and across said conveyor belt and is received by said photocell;

a block fixably mounted to one side of said support member, said block having a tapped vertical hole;

a base member fixably mounted to said machine;

a bracket fixably mounted to said base member; and turning means coupled to said bracket and threadingly engaging said tapped hole so as to couple said support member and block to said base member, said turning means when turned in a first direction causing said yoke to move vertically upward relative to said base member and said conveyor belt and when turned in a counter-direction causing said support member to move vertically downward relative to said base member, whereby the vertical position of said horizontal beam of light is adjustable relative to said conveyor belt run.

PO-1050
(5/69)

UNITED STATES PATENT OFFICE
CERTIFICATE OF CORRECTION

Patent No. 3,573,477          Dated April 6, 1971

Inventor(s) Michael C. Klapes

It is certified that error appears in the above-identified patent and that said Letters Patent are hereby corrected as shown below:

Column 7, lines 45 and 49, the numerals "11" are changed to the numerals "3".

Signed and sealed this 13th day of July 1971.

(SEAL)
Attest:

EDWARD M. FLETCHER, JR.
Attesting Officer

WILLIAM E. SCHUYLER, JR.
Commissioner of Patents